United States Patent
Yu

(10) Patent No.: US 8,294,674 B2
(45) Date of Patent: Oct. 23, 2012

(54) TOUCH PANEL DISPLAY DEVICE WITH SIGNAL TRANSMISSION CHANNEL

(75) Inventor: Chih-Chia Yu, Miao-Li (TW)

(73) Assignee: Chimei Innolux Corporation, Chu-Nan, Miao-Li County (TW)

( * ) Notice: Subject to any disclaimer, the term of this patent is extended or adjusted under 35 U.S.C. 154(b) by 1227 days.

(21) Appl. No.: 12/082,784

(22) Filed: Apr. 14, 2008

(65) Prior Publication Data

US 2008/0252612 A1  Oct. 16, 2008

(30) Foreign Application Priority Data

Apr. 13, 2007  (CN) .......................... 2007 1 0074024

(51) Int. Cl.
*G06F 3/041* (2006.01)
(52) U.S. Cl. ....................................... 345/173; 345/174
(58) Field of Classification Search ................... 345/173
See application file for complete search history.

(56) References Cited

U.S. PATENT DOCUMENTS

| | | | | |
|---|---|---|---|---|
| 5,179,459 A | * | 1/1993 | Plesinger ........................ | 349/73 |
| 6,380,497 B1 | * | 4/2002 | Hashimoto et al. ........... | 200/5 A |
| 6,535,203 B2 | * | 3/2003 | Shigetaka et al. ............. | 345/173 |
| 6,738,038 B2 | * | 5/2004 | Hong ............................. | 345/104 |
| 7,071,926 B2 | * | 7/2006 | Kusuda et al. ................. | 345/173 |
| 7,202,855 B2 | * | 4/2007 | Shigetaka et al. ............. | 345/173 |
| 8,094,134 B2 | * | 1/2012 | Suzuki et al. .................. | 345/173 |
| 2003/0011575 A1 | * | 1/2003 | Matsuda et al. ............... | 345/173 |
| 2003/0052867 A1 | * | 3/2003 | Shigetaka et al. ............. | 345/173 |
| 2003/0058225 A1 | * | 3/2003 | Kusuda et al. ................. | 345/173 |
| 2003/0122797 A1 | * | 7/2003 | Bang et al. ..................... | 345/173 |
| 2004/0051699 A1 | * | 3/2004 | Tanabe et al. .................. | 345/173 |
| 2004/0233175 A1 | * | 11/2004 | Chuang ......................... | 345/173 |
| 2008/0106522 A1 | * | 5/2008 | Nishikawa et al. ............ | 345/173 |
| 2011/0090175 A1 | * | 4/2011 | Mamba et al. ................. | 345/174 |
| 2011/0151937 A1 | * | 6/2011 | Kusuda et al. ................. | 455/566 |

FOREIGN PATENT DOCUMENTS

JP  2003-202959 A  7/2003

* cited by examiner

*Primary Examiner* — Amare Mengistu
*Assistant Examiner* — Sarvesh J Nadkarni
(74) *Attorney, Agent, or Firm* — Muncy, Geissler, Olds & Lowe, PLLC

(57) ABSTRACT

An exemplary touch panel display device (2) includes a display device (26) including a driving chip and a touch panel (20). The touch panel includes a transparent conductive substrate (21) including a first electrode and a second electrode, and a transparent conductive film (22) including a third electrode and a fourth electrode. The four electrodes are connected to the driving chip via a signal transmission channel.

17 Claims, 2 Drawing Sheets

TOUCH PANEL DISPLAY DEVICE WITH SIGNAL TRANSMISSION CHANNEL

CROSS-REFERENCE TO RELATED APPLICATION

This application is related to, and claims the benefit of, a foreign priority application filed in China as Serial No. 200710074024.1 on Apr. 13, 2007. The related application is incorporated herein by reference.

FIELD OF THE INVENTION

The present invention relates to touch panel display devices, and particularly to a touch panel display device with a signal transmission channel.

GENERAL BACKGROUND

A touch panel display device generally includes a display device and a touch panel disposed on the display device. Various operations can be carried out by a user simply via touching appropriate parts of the touch panel with his/her finger or with a stylus. These operation signals are transmitted to the display device via a flexible printed circuit (FPC). The display device can perform predetermined functions according to the operation signals.

FIG. 3 is a schematic, side cross-sectional view of a conventional touch panel display device. The touch panel display device 1 includes a display device 16, a touch panel 10 disposed on the display device 16, and an FPC 18. The display device 16 can be a liquid crystal display, and includes a driving chip 19. The touch panel 10 is electrically connected to the driving chip 19 via the FPC 18. The touch panel 10 includes a transparent conductive substrate 11, a transparent conductive film 12, a cover 13, an adhesive tape 17, and a plurality of spacers 14. The adhesive tape 17 is used to support and adhere the transparent conductive substrate 11 and the transparent conductive film 12 together. The plurality of spacers 14 are distributed between the transparent conductive substrate 11 and the transparent conductive film 12, so as to maintain a certain constant gap therebetween. The cover 13 is disposed on an outer surface of the transparent conductive film 12.

FIG. 4 is a schematic, exploded, isometric view of the touch panel 10. The transparent conductive substrate 11 includes a first electrode 111, a second electrode 112, a first weld 151, and a second weld 152. The first electrode 111 and the second electrode 112 are both parallel to a first direction. The first weld 151 is connected to the first electrode 111 via a wire (not labeled), and the second weld 152 is connected to the second electrode 112 via a wire (not labeled). The transparent conductive film 12 includes a third electrode 123, a fourth electrode 124, a third weld 153, and a fourth weld 154. The third electrode 123 and the fourth electrode 124 are both parallel to a second direction that is perpendicular to the first direction. The third weld 153 is connected to the third electrode 123 via a wire (not labeled), and the fourth weld 154 is connected to the fourth electrode 124 via a wire (not labeled).

The FPC 18 includes a connection section 180. The connection section 180 includes a first pad 181, a second pad 182, a third pad 183, and a fourth pad 184. The connection section 180 is sandwiched between the transparent conductive substrate 11 and the transparent conductive film 12, and the first to the fourth pads 181, 182, 183, 184 contact the first to the fourth welds 151, 152, 153, 154, respectively.

In a process of fabricating the touch panel display device 1, a time required to manufacture the FPC 18 is longer than that to manufacture other components of the touch panel display device 1. The cost of manufacturing the FPC 18 is correspondingly high. Thus, the cost of fabricating the touch panel display device 1 is also high. Furthermore, a hot bar process is needed to weld the connection section 180 of the FPC 18 with the transparent conductive substrate 11 and the transparent conductive film 12. In the hot bar process, a welding temperature is very high. The high welding temperature may alter properties of the transparent conductive substrate 11 and the transparent conductive film 12. This can lead to premature deterioration of the transparent conductive substrate 11 and the transparent conductive film 12. That is, the quality of the touch panel display device 1 is reduced.

What is needed, therefore, is a touch panel display device that can overcome the above-described deficiencies.

SUMMARY

In one aspect, a touch panel display device includes a signal transmission channel, a display device including a driving chip, and a touch panel. The touch panel includes a transparent conductive substrate including a first electrode and a second electrode, and a transparent conductive film including a third electrode and a fourth electrode. The four electrodes are connected to the driving chip via the signal transmission channel.

In another aspect, a touch panel display device includes a display device, a touch panel, and a signal transmission channel disposed in the touch panel. The display device transmits voltage signals to the touch panel via the signal transmission channel.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments in detail.

Figure 1:
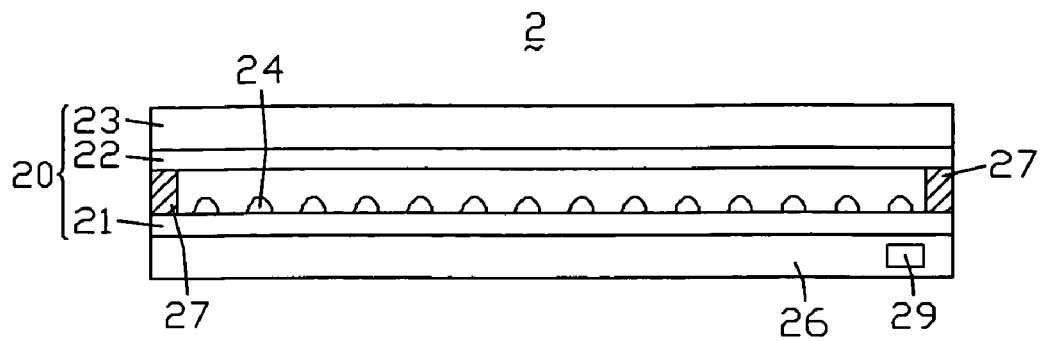
FIG. 1 is a side cross-sectional view of a touch panel display device of one embodiment of the present invention, the touch panel display device including a touch panel.

FIG. 1 is a schematic, side cross-sectional view of a touch panel display device of the present invention. The touch panel display device 2 includes a display device 26, and a touch panel 20 disposed on the display device 26. The display device 26 can be a liquid crystal display, and the display device 26 includes a driving chip 29. The touch panel 20 includes a transparent conductive substrate 21, a transparent conductive film 22, a cover 23, an adhesive tape 27, and a plurality of spacers 24. The transparent conductive substrate 21 can be an indium tin oxide (ITO) glass substrate, and the transparent conductive film 22 can be an ITO film. The adhesive tape 27 is used to support and adhere the transparent conductive substrate 21 and the transparent conductive film 22 together. The plurality of spacers 24 are distributed between the transparent conductive substrate 21 and the transparent conductive film 22, so as to maintain a certain constant gap therebetween. The cover 23 is disposed on an outer surface of the transparent conductive film 22.

Figure 2:
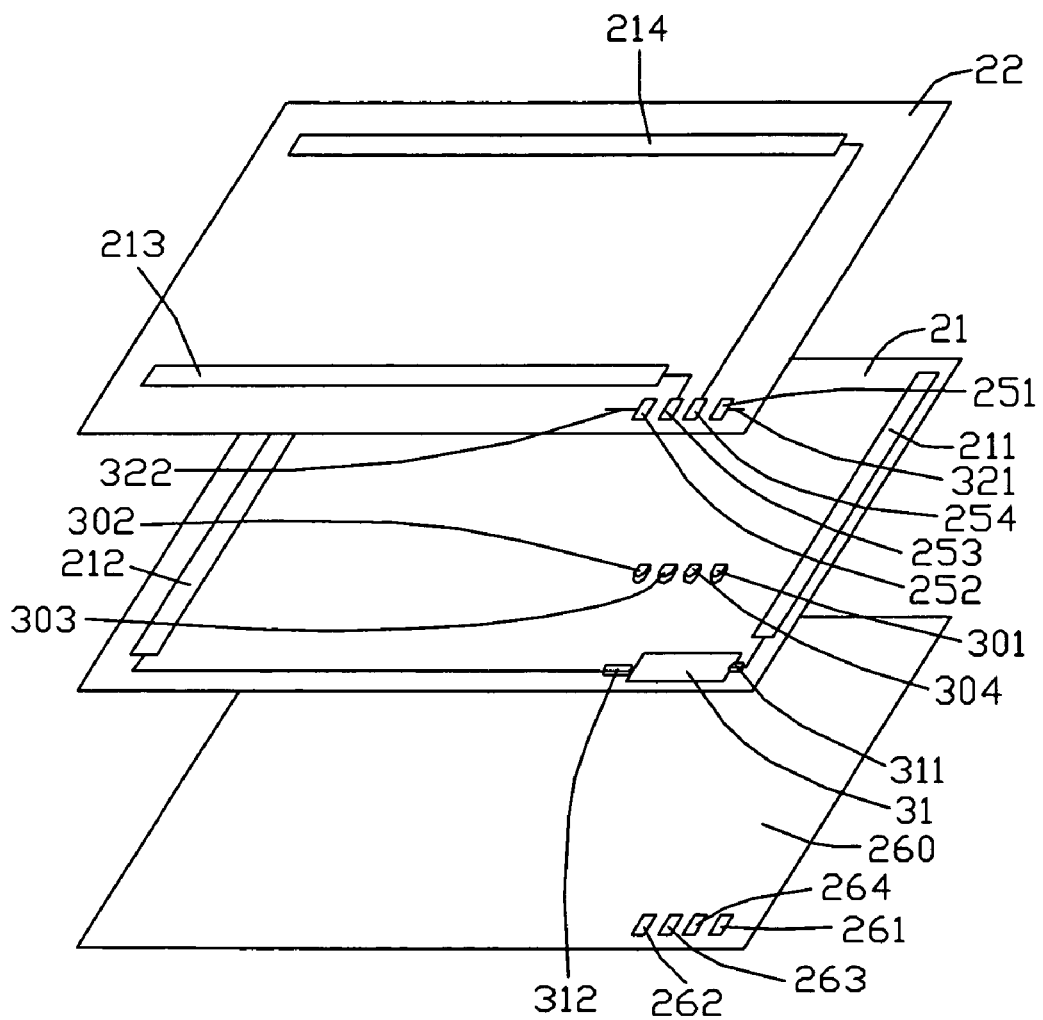
FIG. 2 is an exploded, isometric view of the touch panel of FIG. 1.
Figure 3:
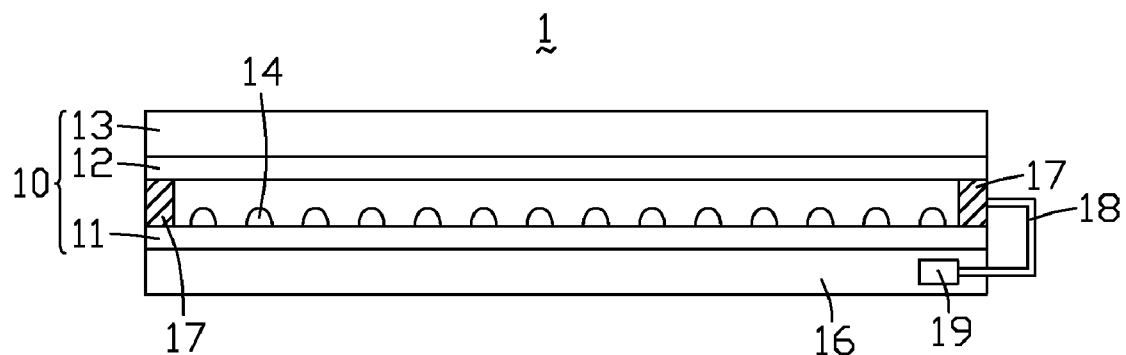
FIG. 3 is a side cross-sectional view of a conventional touch panel display device, the touch panel display device including a touch panel.
Figure 4:
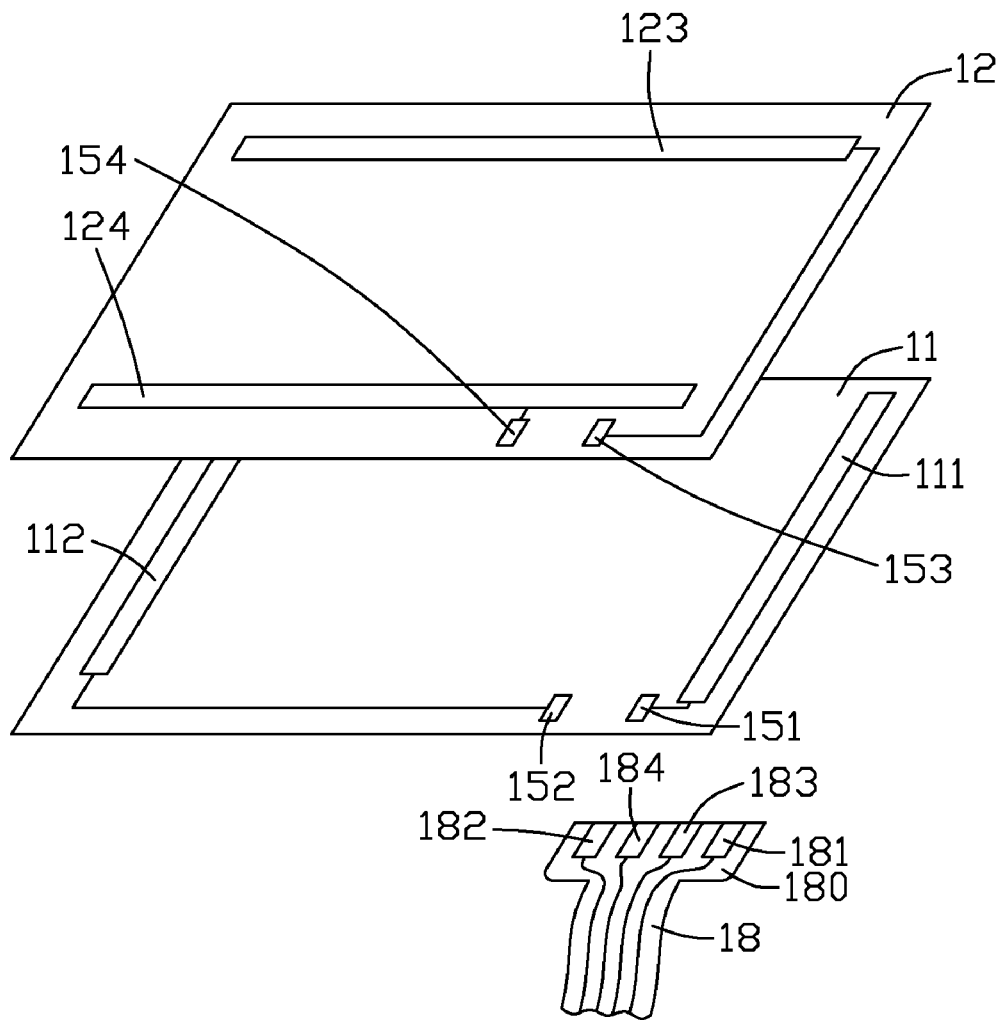
FIG. 4 is an exploded, isometric view of the touch panel of FIG. 3.

FIG. 2 is a schematic, exploded, isometric view of the touch panel of FIG. 1. The transparent conductive substrate 21 includes a first electrode 211 and a second electrode 212. The first electrode 211 and the second electrode 212 are both parallel to a first direction. The transparent conductive film 22 includes a third electrode 213 and a fourth electrode 214. The third electrode 213 and the fourth electrode 214 are both parallel to a second direction that is perpendicular to the first direction. The display device 26 includes a substrate 260, which can for example be a glass substrate. The driving chip 29 is disposed on the substrate 260. The four electrodes 211, 212, 213, 214 are connected to the driving chip 29 via a signal transmission channel (not labeled).

The signal transmission channel includes a first pad 261, a second pad 262, a third pad 263, a fourth pad 264, a channel 31, a first adhesion conductive object 311, a second adhesion conductive object adhesion conductive object 312, a first conductive object 301, a second conductive object 302, a third conductive object 303, a fourth conductive object 304, a first weld 251, a second weld 252, a third weld 253, a fourth weld 254, a first adhesion wire 321, and a second adhesion wire 322. The four pads 261, 262, 263, 264 can be ITO pads. The four pads 261, 262, 263, 264 are disposed on a same corner of the substrate 260, and are isolated from each other. The four pads 261, 262, 263, 264 are connected to the driving chip 29 via a wire (not shown) respectively, wherein the wires can be silver plasma wires. The channel 31 penetrates the transparent conductive substrate 21, and its cross-section is rectangular. The channel 31 can be a through hole of the transparent conductive substrate 21 or a through notch of the transparent conductive substrate 21. The channel 31 is disposed in a corner of the transparent conductive substrate 21, and accommodates the four conductive objects 301, 302, 303, 304. The four conductive objects 301, 302, 303, 304 can be conductive foam or conductive adhesive. The four conductive objects 301, 302, 303, 304 are isolated from each other. The first adhesion conductive object 311 is disposed adjacent to a first side of the channel 31 parallel to the first direction, and the second adhesion conductive object 312 is disposed adjacent to an opposite second side of the channel 31. The first adhesion conductive object 311 is connected to the first electrode 211 via a wire (not labeled), and the second adhesion conductive object 312 is connected to the second electrode 212 via a wire (not labeled). The four welds 251, 252, 253, 254 are disposed on a same corner of the transparent conductive film 22, and are isolated from each other. The four welds 251, 252, 253, 254 can be ITO welds. The first weld 251 is connected to the first adhesion wire 321, and the second weld 252 is connected to the second adhesion wire 322. The third weld 253 is connected to the third electrode 213 via a wire (not labeled), and the fourth weld 254 is connected to the fourth electrode 214 via a wire (not labeled). The first adhesion wire 321 and the second adhesion wire 322 can be silver plasma wires. The first adhesion wire 321 contacts to the first adhesion conductive object 311, and the second adhesion wire 322 contacts to the second adhesion conductive object 312. The first conductive object 301 is sandwiched between the first pad 261 and the first weld 251. The second conductive object 302 is sandwiched between the second pad 262 and the second weld 252. The third conductive object 303 is sandwiched between the third pad 263 and the third weld 253. The fourth conductive object 304 is sandwiched between the fourth pad 264 and the fourth weld 254. The driving chip 29 transmits voltage signals to the first electrode 211 via the first pad 261, the first conductive object 301, the first weld 251, the first adhesion wire 321, the first adhesion conductive object 311, and the wire connected between the first adhesion conductive object 311 and the first electrode 211. The driving chip 29 transmits voltage signals to the second electrode 212 via the second pad 262, the second conductive object 302, the second weld 252, the second adhesion wire 322, the second adhesion conductive object 312, and the wire connected between the second adhesion conductive object 312 and the second electrode 212. The driving chip 29 transmits voltage signals to the third electrode 213 via the third pad 263, the third conductive object 303, the third weld 253, and the wire connected between the third weld 253 and the third electrode 213. The driving chip 29 transmits voltage signals to the fourth electrode 214 via the fourth pad 264, the fourth conductive object 304, the fourth weld 254, and the wire connected between the fourth weld 254 and the fourth electrode 214.

When a user's finger (or a stylus) touches the cover 23, the transparent conductive film 22 is electrically connected to the transparent substrate 21 at a touch point. A period of time during which the transparent conductive film 22 is electrically connected to the transparent substrate 21 is divided into a first period and a second period. The first period is equal to the second period.

In the first period, the driving chip 29 provides a 5V voltage to the first electrode 211 and a 0V voltage to the second electrode 212 via the signal transmission channel. A first voltage of the touch point is transmitted to the driving chip 29 via the third electrode 213, the fourth electrode 214, and the signal transmission channel. The first voltage of the touch point represents a first coordinate of the touch point along the first direction. In the second period, the driving chip 29 provides a 5V voltage to the third electrode 213 and a 0V voltage to the fourth electrode 214 via the signal transmission channel. A second voltage of the touch point is transmitted to the driving chip 29 via the first electrode 211, the second electrode 212, and the signal transmission channel. The second voltage of the touch point represents a second coordinate of the touch point along the second direction. The first coordinate and the second coordinate cooperatively determine a position of the touch point on the touch panel 20.

The touch panel 20 is electrically connected to the display device 26 via the signal transmission channel. Thus, the FPC 18 needed for the above-described conventional touch panel display device 1 is not needed for the touch panel display device 2. A cost of manufacturing the signal transmission channel is typically lower than that of the FPC 18. Thus, a cost of fabricating the touch panel display device 2 is correspondingly reduced. Furthermore, a hot bar process needed for the conventional touch panel display device 1 is not needed in a process of fabricating the touch panel display device 2. Thus, a quality of the touch panel display device 2 is higher than that of the touch panel display device 1.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A touch panel display device, comprising:
a signal transmission channel;
a display device comprising a driving chip and a substrate, the driving chip being on the substrate; and
a touch panel comprising:
a transparent conductive substrate comprising a first electrode and a second electrode; and
a transparent conductive film comprising a third electrode and a fourth electrode;
wherein the four electrodes are connected to the driving chip via the signal transmission channel, the signal transmission channel comprises a first pad, a second pad, a third pad, a fourth pad, a channel, a first adhesion conductive object, a second adhesion conductive object, a first conductive object, a second conductive object, a third conductive object, a fourth conductive object, a first weld, a second weld, a third weld, a fourth weld, a first adhesion wire, and a second adhesion wire;
the four pads are disposed on a corner of the substrate, and the four pads are connected to the driving chip via a wire, respectively;
the channel is disposed on a corner of the transparent conductive substrate and accommodates the four conductive objects;
the first adhesion conductive object is disposed adjacent to a first side of the channel, and the second adhesion conductive object is disposed adjacent to a second side of the channel opposite to the first side;
the first adhesion conductive object is connected to the first electrode via a wire, and the second adhesion conductive object is connected to the second electrode via a wire;
the four welds are disposed on a corner of the transparent conductive film;
the first weld is connected to the first adhesion wire, the second weld is connected to the second adhesion wire, the third weld is connected to the third electrode via a wire, and the fourth weld is connected to the fourth electrode via a wire;
the first adhesion wire is contacted to the first adhesion conductive object, and the second adhesion wire is contacted to the second adhesion conductive object; and
the first conductive object is sandwiched between the first pad and the first weld, the second conductive object is sandwiched between the second pad and the second weld, the third conductive object is sandwiched between the third pad and the third weld, and the fourth conductive object is sandwiched between the fourth pad and the fourth weld.

2. The touch panel display device as claimed in claim 1, wherein the substrate is a glass substrate.

3. The touch panel display device as claimed in claim 1, wherein the channel penetrates the transparent conductive substrate and its cross-section is rectangular.

4. The touch panel display device as claimed in claim 3, wherein the channel is a hole of the transparent conductive substrate.

5. The touch panel display device as claimed in claim 3, wherein the channel is a notch of the transparent conductive substrate.

6. The touch panel display device as claimed in claim 1, wherein the four pads are indium tin oxide pads.

7. The touch panel display device as claimed in claim 1, wherein the four conductive objects are conductive foams.

8. The touch panel display device as claimed in claim 1, wherein the four conductive objects are conductive adhesives.

9. The touch panel display device as claimed in claim 1, wherein the four welds are indium tin oxide welds.

10. The touch panel display device as claimed in claim 1, wherein the adhesion wires are silver plasma wires.

11. The touch panel display device as claimed in claim 1, wherein the wires are silver plasma wires.

12. The touch panel display device as claimed in claim 1, wherein the first electrode and the second electrode are parallel to a first direction, respectively; and the third electrode and the fourth electrode are parallel to a second direction vertical to the first direction, respectively.

13. The touch panel display device as claimed in claim 1, wherein the transparent conductive substrate is an indium tin oxide glass substrate, and the transparent conductive film is an indium tin oxide film.

14. The touch panel display device as claimed in claim 1, wherein the display device is a liquid crystal display.

15. The touch panel display device as claimed in claim 1, wherein the touch panel further comprises a cover, an adhesive tape, and a plurality of spacers; the transparent conductive substrate is adhered with the transparent conductive film via the adhesive tape; the plurality of spacers are dispersed between the transparent conductive substrate and the transparent conductive film; and the cover is on an outer surface of the transparent conductive film.

16. A touch panel display device, comprising a display device comprising a driving chip;
a touch panel comprising a first electrode, a second electrode, a third electrode, and a fourth electrode; and
a signal transmission channel disposed in the touch panel;
wherein the display device transmits voltage signals to the touch panel via the signal transmission channel, the driving chip is configured for transmitting the voltage signals, and the four electrodes are configured for receiving the voltage signals;
the signal transmission channel comprises a first pad, a second pad, a third pad, a fourth pad, a channel, a first adhesion conductive object, a second adhesion conductive object, a first conductive object, a second conductive object, a third conductive object, a fourth conductive object, a first weld, a second weld, a third weld, a fourth weld, a first adhesion wire, and a second adhesion wire;
the driving chip transmits voltage signals to the first electrode via the first pad, the first conductive object, the first weld, the first adhesion wire, the first adhesion conductive object, and a wire connected between the first adhesion conductive object and the first electrode;
the driving chip transmits voltage signals to the second electrode via the second pad, the second conductive object, the second weld, the second adhesion wire, the second adhesion conductive object, and a wire connected between the second adhesion conductive object and the second electrode;
the driving chip transmits voltage signals to the third electrode via the third pad, the third conductive object, the third weld, and a wire connected between the third weld and the third electrode; and
the driving chip transmits voltage signals to the fourth electrode via the fourth pad, the fourth conductive object, the fourth weld, and a wire connected between the fourth weld and the fourth electrode.

17. The touch panel display device as claimed in claim 16, wherein the touch panel further comprises a cover, an adhesive tape, and a plurality of spacers; the transparent conductive substrate is adhered with the transparent conductive film via the adhesive tape; the plurality of spacers are dispersed between the transparent conductive substrate and the transparent conductive film; and the cover is on an outer surface of the transparent conductive film.

* * * * *